United States Patent [19]

Link

[11] 4,320,943
[45] Mar. 23, 1982

[54] CARRIAGE SUPPORT ARRANGEMENT FOR A MICROFICHE READER

[75] Inventor: William T. Link, Berkeley, Calif.
[73] Assignee: Diagraphix, Inc., San Diego, Calif.
[21] Appl. No.: 127,127
[22] Filed: Mar. 4, 1980
[51] Int. Cl.³ .............................................. G03B 23/08
[52] U.S. Cl. .................. 353/27 R; 33/1 M; 308/3 A; 353/25
[58] Field of Search ............... 33/1 M; 308/3 R, 3 A; 353/25, 27 A, 27 R

[56] References Cited

U.S. PATENT DOCUMENTS

| | | | |
|---|---|---|---|
| 3,869,201 | 3/1975 | Lysle | 353/27 R |
| 3,999,847 | 12/1976 | Maeda et al. | 353/27 R |
| 4,217,039 | 8/1980 | Zellner et al. | 353/27 R |
| 4,220,404 | 9/1980 | Hofmann et al. | 353/27 R |

*Primary Examiner*—John W. Shepperd
*Attorney, Agent, or Firm*—Flehr, Hohbach, Test, Albritton & Herbert

[57] ABSTRACT

A microfiche reader is disclosed herein and includes a projection screen and an optical arrnagement adapted to cooperate with a microfiche for providing an enlarged image of the latter on the screen. The reader also includes an assembly for supporting the microfiche for planar movement within the confines of a given area. This support assembly utilizes a carriage for containing the microfiche and, in one embodiment, the carriage is itself supported by a particular diagonal array of bearings whereas, in another embodiment, it is supported by an array of living hinges.

8 Claims, 7 Drawing Figures

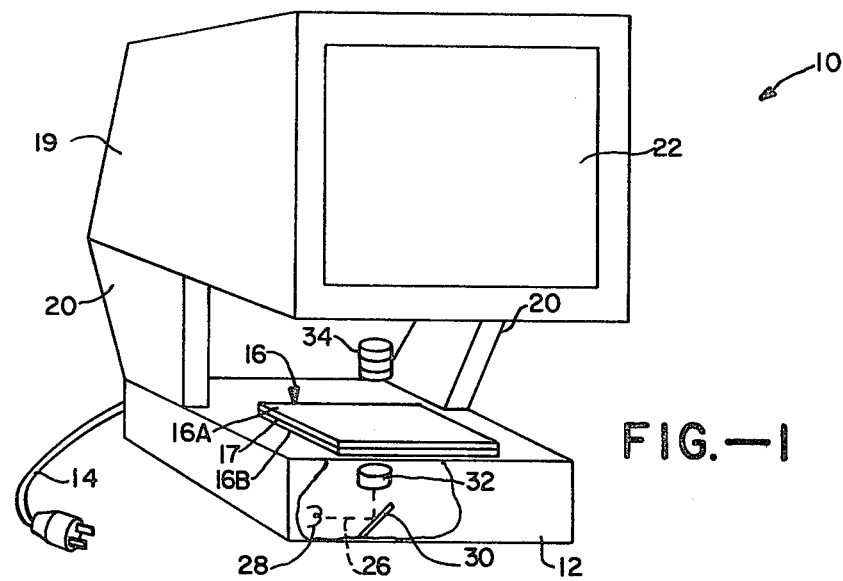
FIG.—1
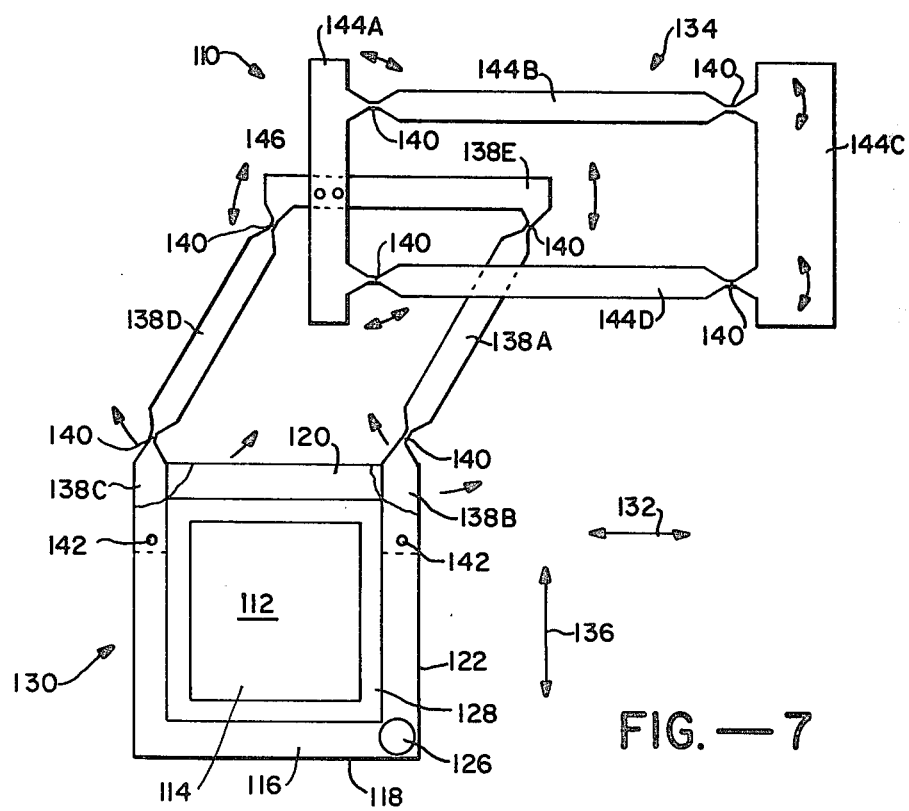
FIG.—7

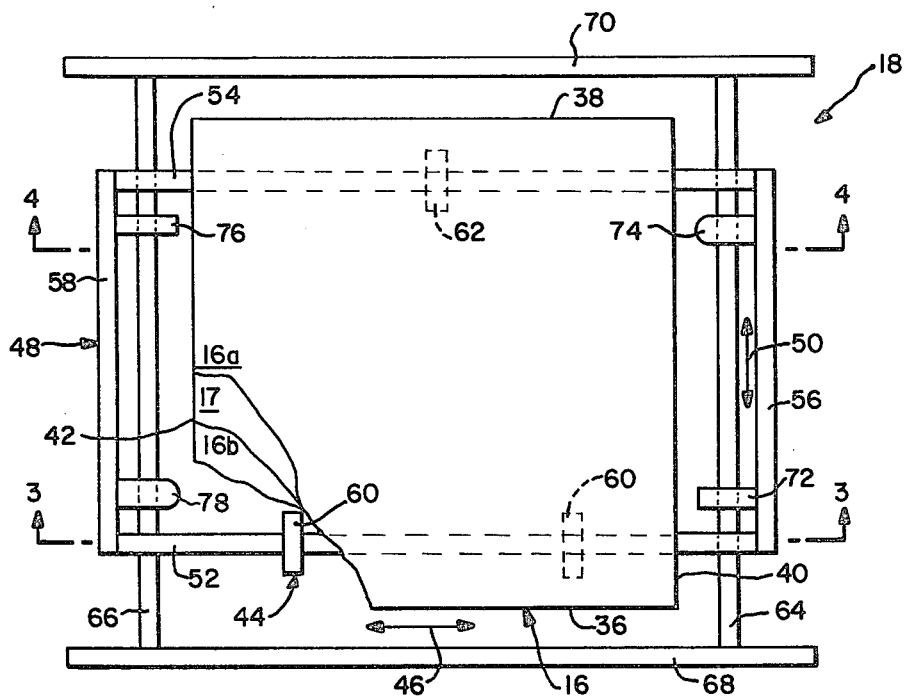
FIG.—2
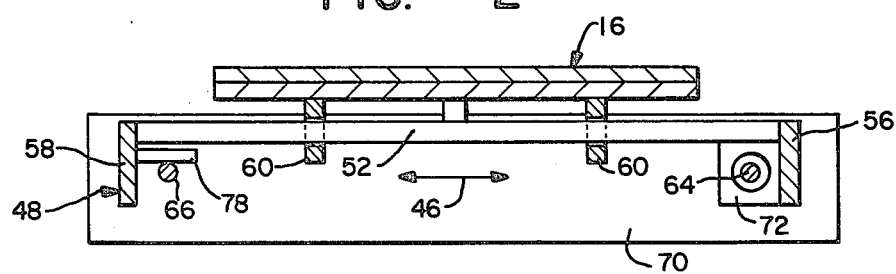
FIG.—3
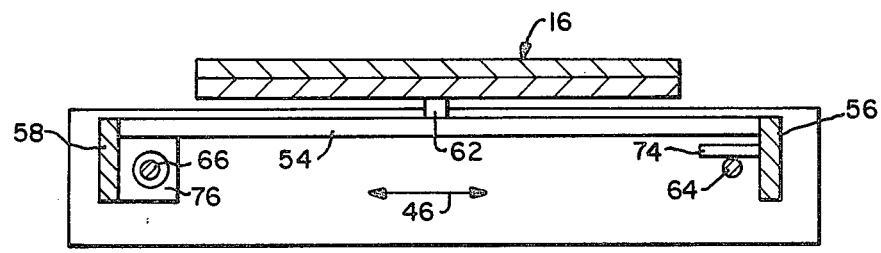
FIG.—4

CARRIAGE SUPPORT ARRANGEMENT FOR A MICROFICHE READER

The present invention relates generally to a microfiche reader for providing an enlarged image of a microfiche on a projection screen and more particularly to an assembly for supporting the microfiche for planar movement within the confines of a given area.

A typical microfiche reader of the general type to which thich the present invention is directed is one which includes a projection screen supported in a fixed position by suitable means, an assembly for supporting the microfiche to be viewed and an optical arrangement for directing a beam of light through the microfiche and onto the screen for projecting an illuminated image of the microfiche thereon.

In most cases, because of size limitations relating to the projection screen, only a segment of the microfiche can be viewed at any given time. This means that the microfiche support assembly must be capable of moving the microfiche to any point within the confines to a given area. In the past, this has been typically accomplished by providing a rectangular area and moving the carriage in a fixed plane within this area. One particular way of doing this is to utilize two pairs of tracks, a first upper pair which supports the carriage for movement along a first straight line path and a second lower pair which supports both the carriage and first pair of tracks for movement along a second straight line path normal to the first path. In this way, the carriage itself can be moved to any point within a given area which is limited laterally and lengthwise by the extent of each pair of tracks.

The carriage support assembly just described is one which utilizes some sort of bearings fixedly connected with and slidably engageable along associated tracks in order to provide the appropriate carriage movement. In this regard, Applicant has found with these fixed bearings, particularly those associated with the lower tracks, are typically provided in pairs on a given track and that either each track of the pair includes two fixed bearings or only one track of a pair includes two fixed bearings while the other track includes at most a slidably engageable but unconnected guide member. Applicant has also found that neither of these particular bearing configurations is completely satisfactory from the standpoint of carriage movement by manual application of force and that there is a tendency for the bearings to hang up unless uniform force is applied to the carriage along those tracks including bearings. If only one track includes bearings then the force should be applied only in line with that track in order to reduce the possibility of hanging up the carriage. This can be inconvenient to the left hander or right hander depending upon the position of the carriage and tracks. By the same token, where each track of a pair includes two bearings, this could require two hands which may be more inconvenient and would additionally require extreme manufacturing precision in locating the two tracks within the microfiche reader.

In accordance with one aspect of the present invention, as will be seen hereinafter, a carriage support assembly is provided with a particular positional configuration of fixed bearings which is provided for its lower set of tracks and which reduces the hangup problems just described and allows the carriage and its upper set of tracks to more easily move along the lower tracks. However, in accordance with another aspect of the present invention, a carriage support assembly is provided and bearings are eliminated altogether. In this case, the carriage is moved by means of living hinges to be described in the detailed description to follow.

An object of the present invention is to provide a microfiche reader of the general type described above, but one having an improved carriage support assembly.

A more specific object of the present invention is to provide an uncomplicated and economical support assembly which is specifically designed so that its carriage can be readily and easily moved manually to any point within the confines of a given area.

Another object of the present invention is to accomplish this utilizing parallel tracks and unique positional configuration of fixed bearings mounted for slidable movement along these tracks.

Still another object of the present invention is to provide an uncomplicated and economical carriage support assembly which does not utilize tracks and associated bearings at all, but rather living hinges which not only results in ease of movement of the carriage but allows the entire assembly to be more economically manufactured.

As will be seen hereinafter, the microfiche reader disclosed herein is one which includes a projection screen, an assembly for supporting a microfiche for planar movement within the confines of a given area and an optical arrangement which cooperates with the microfiche for providing an enlarged image of the latter, actually a segment of the latter, on the screen. This microfiche support assembly includes a carriage for fixedly containing the microfiche, first means supporting the carriage and therefore the microfiche for movement along a first path and second means supporting the carriage and first means for movement along the second path. These paths are selected so that the carriage itself can be moved to any point within the confines of the given area.

In accordance with one aspect of the present invention, the second means just recited includes first and second spaced apart tracks and respective first and second bearing means fixedly connected with and slidably engageable along the tracks. However, in order to provide the ease of movement discussed above, the fixed bearing means associated with one of these tracks is at all times located adjacent the back end of the carriage means while the fixed bearing means associated with the other track is at all times located adjacent the front end of the carriage means and this is true regardless of the position of the carriage means within the given area of movement. This "diagonal bearing configuration" has been found to minimize, if not eliminate, the hangup problem discussed previously, as well as to provide for ease of carriage movement generally.

In accordance with another aspect of the present invention, the overall carriage support assembly has been designed to eliminate the previously described tracks and bearing means altogether. Rather, the first and second carriage support means recited utilizes rigid, frame members and living hinges which together with the carriage means itself form two parallelograms. These parallelograms are movable back and forth to provide the appropriate movement of the carriage. More specifically, as will be seen, the first of these parallelograms is fixedly connected with one side of the carriage means and the second parallelogram is fixedly connected to one side of the first parallelogram so that the carriage means is movable to any point within the given area.

FIG. 1 is a perspective view of a microfiche reader.

FIG. 2 is a plan view of a carriage support assembly which comprises part of the reader illustrated in FIG. 1 and which is designed in accordance with the present invention.

FIG. 3 is a sectional view of the carriage support assembly taken generally along line 3—3 in FIG. 2.

FIG. 4 is a sectional view of the carriage support assembly taken generally along line 4—4 in FIG. 2.

FIG. 7 is a plan view of a carriage support assembly constructed in accordance with still another embodiment of the present invention.

Figure 5:
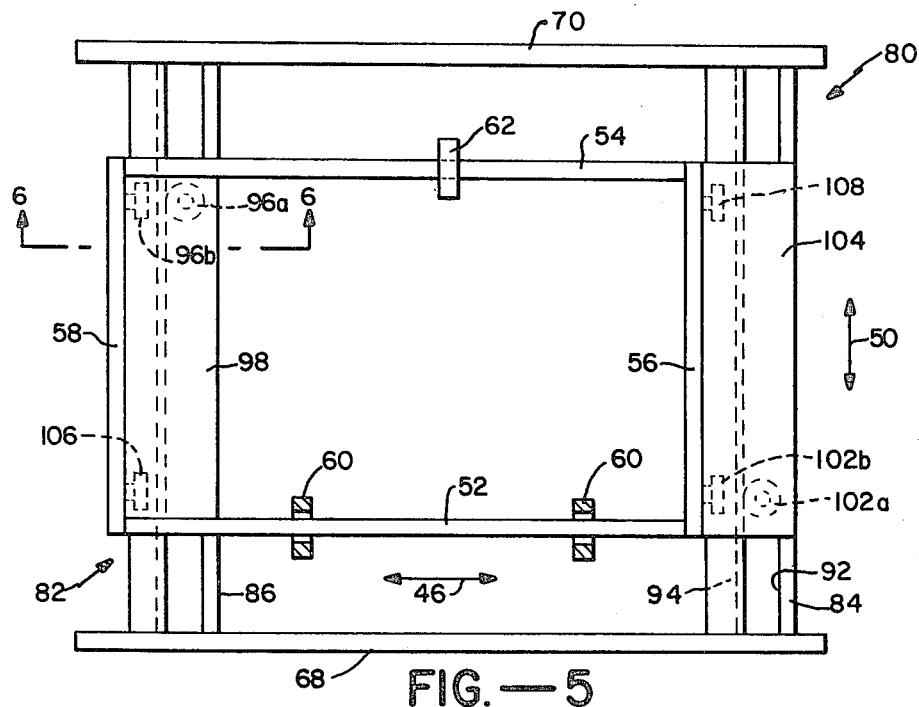
FIG. 5 is a plan view of a portion of a carriage support assembly constructed in accordance with a second embodiment of the present invention.

Turning now to the drawings, wherein like components are designated by like reference numerals throughout the various figures, a microfiche reader is illustrated in FIG. 1 and generally designated by the reference numeral 10. This microfiche reader utilizes a base 12 which serves to house a number of components including part of an optical arrangement as well as means including a power cord 14 for powering this arrangement. The base also serves to support a carriage 16 comprising a pair of hinge mounted, light transparent glass plates 16A and 16B which, in turn, serve to contain a microfiche 17 therebetween. The top plate 16A is movable between a raised position so that the microfiche can be inserted over plate 16B and a lowered position against the bottom plate so that the microfiche can be held in place in a predetermined plane. In an actual embodiment, carriage 16 comprises part of an overall carriage support assembly 18 (see FIGS. 2 to 4) designed in accordance with one embodiment of the present invention. As will be seen hereinafter, this assembly is designed to move the two plates to any point within a given area in the predetermined plane. Reader 10 also includes a main housing 19 which, like base 12, serves to support components of the reader's optical assembly within its own internal chamber. This housing which is held in place above the base by two support frames 20 also serves to support a projection screen 22 having a rear projection side facing into the housing chamber and a front viewing side.

As stated above, microfiche reader 10 includes an optical arrangement. This arrangement may be of any suitable type, but preferably is one which is disclosed in copending U.S. patent application, Ser. No. 127,240, filed Mar. 4, 1980, and entitled MICROFICHE READER ASSEMBLY AND METHOD U.S. patent application, Ser. No. 127,228, filed Mar. 4, 1980, and entitled OPTICAL ARRANGEMENT FOR USE IN A MICROFICHE READER AND METHOD and/or U.S. patent application, Ser. No. 127,230, filed Mar. 4, 1980, and entitled LENS ARRANGEMENT FOR MICROFICHE READER ASSEMBLY AND METHOD each of which have been assigned to assignee of the present invention. Whether the optical arrangement is of a conventional type or of the type in any of the recited copending applications, it serves to provide an image onto the back side of the screen 22 for viewing from its front side. In order to accomplish this, the arrangement includes a number of components which together direct a beam of light along a predetermined path (indicated by dotted lines at 26 in FIG. 1) through a segment of the microfiche appropriately positioned between plates 16A and 16B and ultimately towards the back side of screen 22. These components include a light source 28 operatively connected with cord 14 by a suitable receptacle (not shown) and associated reflector (also not shown). These components also include a first mirror 30 for redirecting the light beam from its initial horizontal direction to a vertically upward direction through the microfiche and into housing 19 through an appropriate opening. Additional mirrors (not shown) are provided within the housing for redirecting the beam towards screen 22. Further components for this optical arrangement include a condenser lens 32 located on the beam path optically between light source 28 and the supported microfiche and projection lens assembly 34 located on the beam path optically between the supported microfiche and projection screen. All of these components are fixedly located in position by suitable mounting means (not shown).

As stated previously, microfiche reader 10 utilizes an overall carriage assembly 18 including a carriage 16 for supporting microfiche 17 for planar movement within the confines of a given area which, as will be seen, is rectangular in configuration. In this regard, the carriage itself is also rectangular in configuration and includes a front end 36, a back end 38 and opposite sides 40 and 42. As will be seen below, overall assembly 18 also includes a first or upper arrangement 44 for supporting the carriage and therefore microfiche 17 for left to right or lateral movement as viewed from the front of the reader. This movement extends along a first straight line path laterally from one side of the given area of movement to the opposite side thereof, as indicated by the two-way arrow 46. As will also be seen, a second or lower arrangement 48 is provided for supporting the carriage and arrangement 44 for back and forth movement along a second straight line path normal to path 46 from one end of the given area to its opposite end, as indicated by two-way arrow 50.

Turning specifically to FIGS. 3 and 4 in conjunction with FIG. 2, upper support arrangement 44 is shown to include a pair of spaced apart tracks 52 and 54 which are parallel with one another and with path 46 as well as the front and back ends of carriage 16. As seen best in FIG. 1, these tracks, which are circular in cross section, are interconnected to one another by two end plates 56 and 58 which, as will be seen hereinafter, comprise part of arrangement 48. Arrangement 44 also includes two annular bearings 60 which are fixedly connected to the underside of the carriage, specifically to the underside of plate 16B by suitable means (not shown) and which are constructed of suitable bearing type material such as nylon or the like. These bearings are fixedly connectedly circumferentially around and are in slidable engagement along the length of front track 52.

It should be apparent that the two bearings 60 support the front end of carriage 16 for movement along track 52 and hence along path 46. The back end of the carriage is supported for movement along track 54 and therefore also along path 46 by means of a single guide member 62 which may also be constructed of a suitable bearing type of material such as nylon and which is also fixedly connected to the underside of plate 16B by suitable means, but rearwardly of bearings 60. This guide member merely rests against the top lengthwise side of track 54 and hence remains unconnected with but slidably engageable along the track as the carriage is moved back and forth along path 46.

Having described support arrangement 44, attention is now directed to support arrangement 48. Like the upper support arrangement, this lower arrangement includes a pair of spaced apart tracks 64 and 66 which are parallel to one another and to path 50 as well as the sides 40 and 42 of the carriage. These tracks which are also circular in cross section extend between and are interconnected together by a front plate 68 and a back plate 70 and are located just below and inside previously described plates 56 and 58, as best seen in FIG. 2. As stated above, side plates 56 and 58 comprise part of arrangement 48. Plate 56 supports an annular bearing 72 in close proximity to track 52 and a projecting guide member 74 in close proximity to track 54. On the other hand, plate 58 supports an annular bearing 76 in close proximity to track 54 and a guide member 78 in close proximity to track 52. The two bearings may be identical in construction and design to the previously described bearings 60 and are respectively fixedly connected with and slidably engageable along the two tracks 64 and 66 as best seen in FIGS. 3 and 4. The two guide members 74 and 78 may be identical in function to guide member 62 and, hence, merely engage against the top lengthwise sides of these two associated tracks, thereby remaining unconnected with but slidably engageable along the tracks.

It should be apparent from FIGS. 2 to 4 that overall support arrangement 48 includes a single fixed bearing for movement along track 64, (specifically bearing 72) and a single fixed bearing for slidable movement along track 66 (specifically bearing 76). It should be equally apparent from these figures that these two fixed bearings are diagonally positioned, that is, the fixed bearing 72 is located near the front end of carriage 16 and the fixed bearing 76 is located near the back end of the carriage, regardless of the position of the latter along tracks 52 and 54 or tracks 64 and 66. It has been found that this allows the carriage and upper arrangement 44 to be more readily moved manually back and forth along path 50, that is, along tracks 64 and 66, when this movement is provided by application of force at the front end 36 of the carriage, typically by the operator's finger tips. The operator does not have to place his finger tips at any particular point along the front edge to easily move the carriage. This is to be contrasted with the previously described prior art situation where two bearings are located along a single track requiring the operator to position his fingers in close proximity to or in actual alignment with that track for providing easy movement. It is also to be contrasted with the situation where laterally aligned as opposed to diagonally aligned bearings are used on two tracks so that hangup problems occur regardless of where the operator's finger tips are placed unless of course equal force is applied simultaneously to and in alignment with both tracks.

Having described overall carriage support assembly 18, it should be apparent that the carriage itself can be moved to any point within a given rectangular area by merely moving the carriage along tracks 52 and 54 and by moving the carriage and these tracks along tracks 64 and 66. The maximum lateral extent of the given area is determined by the length of tracks 52 and 54 and the maximum lengthwise extent of this area is determined by the length of tracks 64 and 66. The carriage and its associated support arrangement 44 are supported for lengthwise movement by diagonally positioned bearings 72 and 76 in accordance with the present invention, as stated. Moreover, while the upper arrangement was not described as including a diagonal relationship between its bearings, this is beecause in most cases such a relationship is not necessary. More specifically, in most cases, the operator will automatically manually move the carriage laterally by placing his finger tips at the front edge of the carriage which is already in very close proximity to the track 52, that is, the track including the two bearings 60. However, it is to be understood that arrangement 44 could also include a pair of diagonally aligned bearings. In this case, one of the bearings would be positioned around track 52 in close proximity to one of the sides of carriage 16, for example side 40, while the other bearing would be positioned around track 54 in close proximity to the other side of the carriage, for example side 42.

Figure 6:
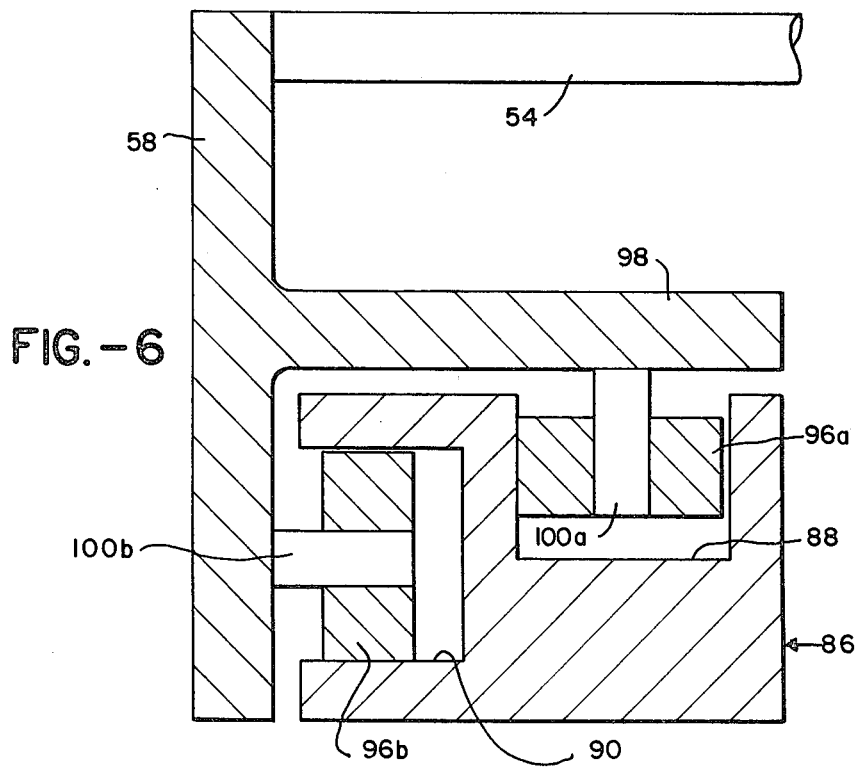
FIG. 6 is a sectional view of the assembly of FIG. 5 taken generally along line 6—6 in FIG. 5.

Having described carriage support assembly 18 and its method of operation, attention is now described to FIGS. 5 and 6 which illustrate a carriage support assembly 80 which is constructed in accordance with a second embodiment of the present invention. To a large extent, assembly 80 may be identical to previously described carriage support assembly 18. For example, assembly 80 may include an identical carriage 16 (not shown) and an identical upper support arrangement 44 including tracks 52 and 54, annular bearings 60 and guide member 62. Moreover, assembly 80 may include certain parts of the previously described lower support arrangement 48 of assembly 18. These parts include track connecting plates 56 and 58 which, at least in part, serve to interconnect the two tracks 52 and 54 and track interconnecting plates 68 and 70 which in assembly 18 serves to interconnect the track 64 and 66. In the assembly 80, these latter plates also serve to interconnect two tracks which in function are identical to tracks 64 and 66. However, the two tracks of assembly 80, which will be described hereinafter, are significantly different in cross sectional configuration than the previously described tracks 64 and 66.

As stated above, overall carriage support assembly 80 includes previously described carriage 16 and upper support arrangement 44. However, this assembly also includes a lower support arrangement 82 which is provided for the same purpose as previously described lower support arrangement 48, that is, to support the carriage and upper support arrangement for movement along previously described straight line path 50. This lower arrangement includes two spaced apart, parallel tracks 84 and 86 which are located in the same positions as previously described tracks 64 and 66 and which serve the same function as these latter tracks, as stated above. However, as best seen in FIG. 6, track 86 includes a vertically upwardly facing top groove 88 and a horizontally facing side groove 90, each of which extends the length of the track. The side groove 90 faces away from track 84 which includes a similar vertically upwardly facing groove 92 and horizontally facing side groove 94. However, this side groove faces track 86 as seen in FIG. 5. These two tracks are interconnected together and extend between the previously described plates 68 and 70.

In order to support carriage 16 and upper support arrangement 44 for movement along tracks 84 and 86, arrangement 82 also includes a number of disc shaped bearings which may be constructed of any suitable bearing type material such as nylon and which are sized to sit within and slidably move along the length of the top and side channels as described. Two such bearings generally indicated at 96A and B in FIGS. 5 and 6 are supported at the rear end of plate 58 near the back end of carriage 14 and serve the same function as previously described annular bearing 76. As seen best in FIG. 6, disc or wheel bearing 96A is fixedly mounted to the underside of a flange 98 by means of a stem or axle 100A. The flange extends the length of track 86 just above the latter and is fixedly connected in place to and projects from plae 58, positioning the disc bearing 96A within top groove 88. Disc bearing 96B is fixedly connected to the lower inside surface of flange 58 by means of a stem 100B and is disposed within side groove 90. A second pair of disc bearings 102A and 102B are similarly supported to side plate 56 utilizing the horizontal flange 104. However, disc bearings 102A and 102B are located adjacent track 52 near the front end of carriage 16 and serve the same function as previously described annular bearing 72. The disc bearing 102A is positioned within top groove 92 and the disc bearing 102B is positioned within side groove 94.

From the foregoing, it should be apparent that the two pairs of disc bearings thus far described are diagonally positioned relative to one another and provide the same advantages as discussed previously with respect to annular bearings 72 and 76 from a diagonal positioning standpoint. Because two discs are used at each corner, all movement but lengthwise movement along the track is restrained. More specifically, if any attempt is made to move the back left hand corner of carriage 16 up from track 86, bearing 96B prevents such movement and if any attempt is made to move the same corner laterally relative to the track, bearing 96A prevents this. The same is true for the front right hand corner of the carriage. The remaining corners include guide members which serve the same function as previously described guide members 74 and 78. More specifically, support arrangement 82 includes a single disc bearing 106 which is fixedly connected to the lower inner surface of plate 58 at the front end of the latter and which is located in side groove 90. This bearing serves the same function as guide 76. A single disc bearing 108 is fixedly connected to the lower outer surface of plate 56 at its back end and is located within guide groove 94. This latter disc bearing serves the same function as guide 74.

Having described carriage support arrangement 80, attention is now directed to FIG. 7 which illustrates an overall carriage support assembly 110 which does not utilize bearings at all. This latter assembly may be readily substituted for either of the two assemblies described in overall microfiche reader 10 and, as will be seen hereinafter, utilizes what may be referred to as "living hinges" in lieu of either annular or disc bearings as well as the guide members previously described. A living hinge may be defined as a relatively thin, elongated strip of material which is sufficiently flexible to bend back and forth about a fixed axis an extremely large number of times without failing and which is used as a hinge. The living hinges comprising a part of assembly 110 to be described have been flexed back and forth a minimum of one million times and still have not failed.

As seen in FIG. 7, assembly 110 includes a microfiche carriage 112 for fixedly containing a microfiche 114 within a predetermined plane. The carriage itself includes a rectangular frame 116 constructed of rigid material and having a front end 118, a back end 120 and opposite sides 122 and 124. A handle 126 may be fixedly connected to the frame, preferably at one corner as illustrated. The frame supports an interior light transparent plate 128 which serves to support microfiche 114. A top, light transparent plate (not shown) is preferably used on top of the microfiche to maintain the latter in place.

In addition to carriage 112, overall support assembly 110 includes a first arrangement 130 for supporting the carriage and therefore the microfiche for movement back and forth along a first somewhat lateral path indicated by the two-way arrow 132. The assembly also includes a second arrangement 134 for supporting the carriage and first arrangement for movement back and forth along a somewhat lengthwise path generally indicated at 136. These two paths which are approximately perpendicular to one another are selected so that the carriage itself is movable anywhere within the confines of a given area.

In order to support carriage 112 for movement back and forth along path 132, arrangement 130 includes a plurality of rigid members 138A, B, C, D and E which are interconnected together by living hinges 140 as seen in FIG. 7. The two rigid members 138B and 138C are fixedly connected to the underside of carriage frame 116 along sides 122 and 124 adjacent back end 120 by suitable means such as bolts 142. These rigid members and back end 120 of the frame together form a parallelogram extending within the plane of microfiche 114 and having one side movable back and forth parallel with path 132.

In order to move the carriage and the support arrangement just described back and forth along path 136, support arrangement 134 also includes a plurality of rigid members 144A, B, C and D which are interconnected together by identical living hinges 140 to form a second parallelogram extending within the same plane and having one side, specifically side 144A, movable back and forth parallel with path 136. In addition, this same side is interconnected to side 138E of the first parallelogram by means of bolts or other suitable means 146. The opposite side of the second parallelogram, specifically side 144C while not shown, would be fixedly connected in position to previously described casing 12 of reader 10.

From the foregoing, it should be apparent that the various living hinges 140 flex back and forth in the manner shown by arrows to allow carriage 112 to move to any point within a given area. While the various components making up this overall assembly and particularly the framework and rigid members may be of any suitable material, in a preferred embodiment, the entire framework, with the exception of the light transparent plate or plates and the bolts and handle, are preferably constructed of a molded plastic. In fact, in a most preferred embodiment, the rigid members 138 and their associated living hinges are preferably part of a single, integrally formed member and this is also true of the four rigid members 144 and their associated living hinges.

What is claimed is:

1. In a microfiche reader including a projection screen and an optical arrangement adapted to cooperate with a microfiche for providing an enlarged image of the latter onto said screen, an assembly for supporting said microfiche for planar movement within the confines of a given rectangular area within a predetermined plane, said assembly comprising:

(a) carriage means for fixedly containing said microfiche within said plane, said carriage means including a front end, an opposite back end and opposite sides extending from said front end to said back end;
(b) first means supporting said carriage means and therefore said microfiche for movement along a first straight-line path laterally from one side of said area to an opposite side thereof; and
(c) second means supporting said carriage means and said first means for movement along a second straight-line path normal to said first path from one end of said area to an opposite end thereof, said second means including
  (i) first and second spaced apart tracks extending between said opposite ends parallel with said second path,
  (ii) first and second bearing means fixedly connected with and slidably engageable along said first and second tracks respectively, said first bearing means being located adjacent the back end of said carriage means and said second bearing means being located adjacent the front end of said carriage means regardless of the position of said carriage means within said area, and
  (iii) first and second guide means unconnected with but slidably engageable along said first and second tracks, respectively, said first guide means being located adjacent the front end of said carriage means and said second guide means being located adjacent the back end of said carriage means regardless of the position of the latter.

2. An assembly according to claim 1 wherein said first and second bearing means are circumferential in configuration and respectively extend around said first and second tracks.

3. An assembly according to claim 1 wherein each of said tracks includes a vertically upwardly facing top groove and a horizontally facing side groove, each of which extends the length of the track, and wherein each of said bearing means associated with said tracks includes a pair of bearing members respectively positioned for slidable movement within the top and side grooves of an associated track.

4. An assembly according to claim 3 wherein each of said guide means includes a bearing member positioned for slidable movement within the side groove of an associated track.

5. In a microfiche reader including a projection screen and an optical arrangement adapted to cooperate with a microfiche for providing an enlarged image of the latter onto said screen, an assembly for supporting said microfiche for planar movement within the confines of a given rectangular area within a predetermined horizontal plane, said assembly comprising:
(a) a rectangular carriage including a pair of horizontally extending light transparent plates in confronting relationship with one another for containing said microfiche within said plane, said carriage including a front end and opposite back and extending laterally across the carriage and opposite sides extending the length of said carriage between said front end and said back end;
(b) a first arrangement for supporting said carriage for lateral, straight-line movement from one side of said given area to the other side thereof, said arrangement including
  (i) first and second spaced-apart tracks extending across said area from one side thereof to the other parallel with the front and back ends of said carriage, and
  (ii) means for supporting said carriage for slidable movement along said tracks; and
(c) a second arrangement for supporting said carriage and said first arrangement for lengthwise, straight-line movement from one end of said area to an opposite end thereof, said second arrangement including
  (i) third and fourth spaced-apart tracks extending between said opposite ends parallel with the sides of said carriage,
  (ii) first and second bearing means fixedly connected with and slidably engageable along said third and fourth tracks, respectively, said first bearing means being located adjacent the back end of said carriage and said second bearing means being fixedly located adjacent the front end of said carriage regardless of the position of said carriage within said area, and
  (iii) first and second guide means unconnected with but slidably engageable along said third and fourth tracks, respectively, said first guide means being located adjacent the front end of said carriage and said second guide means being located adjacent the back end of said carriage means regardless of the position of the latter.

6. An assembly according to claim 5 wherein said first and second bearing means are circumferential in configuration and respectively extend around said third and fourth tracks.

7. An assembly according to claim 5 wherein each of third and fourth tracks includes a vertically upwardly facing top groove and a horizontally facing side groove facing away from the opposite track, each of said grooves extending the length of the track and wherein each of said bearing means associated with said tracks includes a pair of bearing discs, respectively positioned for slidable movement within the top and side grooves of an associated track.

8. An assembly according to claim 7 wherein each of said guide means includes a bearing disc positioned for slidable movement within the side groove of an associated track.

* * * * *